US 9,362,843 B2

(12) United States Patent
Eum et al.

(10) Patent No.: US 9,362,843 B2
(45) Date of Patent: Jun. 7, 2016

(54) SWITCH CONTROL DEVICE, POWER SUPPLY DEVICE COMPRISING THE SAME, AND DRIVING METHOD OF POWER SUPPLY DEVICE UTILIZING TURN-ON PERIOD HALF-ON TIME POINT DETECTION (71) Applicant: FAIRCHILD KOREA SEMICONDUCTOR LTD., Bucheon (KR)

(72) Inventors: Hyun-Chul Eum, Seoul (KR); Seung-Uk Yang, Anyang-si (KR)

(73) Assignee: Fairchild Korea Semiconductor LTD (KR)

( * ) Notice: Subject to any disclaimer, the term of this patent is extended or adjusted under 35 U.S.C. 154(b) by 0 days.

(21) Appl. No.: 13/965,485

(22) Filed: Aug. 13, 2013

(65) Prior Publication Data

US 2014/0043879 A1 Feb. 13, 2014

(30) Foreign Application Priority Data

Aug. 13, 2012 (KR) .................. 10-2012-0088639
Jul. 8, 2013 (KR) .................. 10-2013-0079955

(51) Int. Cl.
*H02M 3/156* (2006.01)
*H02M 7/217* (2006.01)
*H05B 33/08* (2006.01)
*H02M 1/42* (2007.01)

(52) U.S. Cl.
CPC ........... *H02M 7/217* (2013.01); *H05B 33/0818* (2013.01); *H02M 2001/4291* (2013.01); *Y02B 70/126* (2013.01)

(58) Field of Classification Search
CPC ................. H02M 3/155–3/157; H02M 3/1588
USPC .................................. 323/282–285
See application file for complete search history.

(56) References Cited

U.S. PATENT DOCUMENTS

| 6,961,253 | B1* | 11/2005 | Cohen ............................ 363/89 |
| 2005/0162143 | A1 | 7/2005 | Fukumoto et al. |
| 2010/0109615 | A1* | 5/2010 | Hwang et al. ................ 323/205 |
| 2010/0118573 | A1* | 5/2010 | Saint-Pierre .................. 363/126 |
| 2011/0267850 | A1 | 11/2011 | Lin et al. |
| 2013/0314961 | A1 | 11/2013 | Eom et al. |
| 2014/0313798 | A1 | 10/2014 | Eum et al. |

OTHER PUBLICATIONS

Fairchild Semiconductor, User Guide for FEBFL7701_L30U003A, 2.4W LED Ballast Using FL7701, Featured Fairchild Product: FL7701, 2012, 24 pages, Rev. 1.0.2.

* cited by examiner

*Primary Examiner* — Yemane Mehari
(74) *Attorney, Agent, or Firm* — Grossman Tucker Perreault & Pfleger PLLC (57) ABSTRACT The present invention relates to a switch controller, a power supply including the same, and a method for driving the same. An AC input of the power supply is connected to a rectification circuit. The power supply includes a power switch to which an input current passed through the rectification circuit flows during an on-period and a switch controller, the switch controller detects a half-on time point that is the intermediate time point of the on-period, detects a sense voltage that is determined by a current flowing to the power switch during the on-period at the half-on time point, generates a modulation wave by controlling a reference wave according to the detected voltage, and controls switching operation of the power switch according to the modulation wave.

22 Claims, 6 Drawing Sheets

SWITCH CONTROL DEVICE, POWER SUPPLY DEVICE COMPRISING THE SAME, AND DRIVING METHOD OF POWER SUPPLY DEVICE UTILIZING TURN-ON PERIOD HALF-ON TIME POINT DETECTION

CROSS-REFERENCE TO RELATED APPLICATION

This application claims priority and the benefit of Korean Patent Application No. 10-2012-0088639, filed with the Korean Intellectual Property Office on Aug. 13, 2012, and Korean Patent Application No. 10-2013-0079955, filed with the Korean Intellectual Property Office on Jul. 8, 2013, the entire contents of which are incorporated herein by reference.

BACKGROUND OF THE INVENTION (a) Field of the Invention

An exemplary embodiment of the present invention relates to a switch controller and a power supply including the same. Furthermore, the exemplary embodiment of the present invention relates to a method for driving the power supply.

(b) Description of the Related Art

An LED string includes a plurality of LED elements that are coupled in series. Conventionally, the leap of an LED current supplied to the LED string is sensed for constant current (CC) control.

Under a condition that a buck converter is used to supply the LED current, the LED current is influenced by variation of an input voltage, an inductor, and an output voltage.

For example, when an input voltage of the buck converter is lower than an output voltage, power is not supplied to the output terminal. In further detail, when the input voltage is determined by a sinewave and the output voltage maintains a constant level, a period during which the input voltage is lower than the output voltage is generated. During the period, no power supply is performed, and accordingly the LED current is changed according to the period.

In addition, a ripple of an inductor current is changed according to inductance of the inductor. For example, the ripple is increased as the inductance is decreased. The LED current is estimated as an average of the inductor current, and therefore the LED current is decreased as the ripple is increased.

As described, variations of the input voltage, the output voltage, and the inductor cause occurrence of an error in the LED current.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switch controller generating an LED current according to CC control by reducing an error of the LED current, a switch control method, and a power supply including the same.

A power supply according to an exemplary embodiment of the present invention includes a rectification circuit connected to an AC input, a power switch to which an input current passed through the rectification circuit flows during an on-period, and a switch controller.

The switch controller detects a half-on time point that is the intermediate time point of the on-period, detects a sense voltage that is determined by a current flowing to the power switch during the on-period at the half-on time point, generates a modulation wave by controlling a reference wave according to the detected voltage, and controls switching operation of the power switch according to the modulation wave.

The switch controller generates a current sense voltage by receiving the sense voltage at the half-on time point, generates a feedback voltage according to a difference between the current sense voltage and a predetermined reference voltage, and controls the reference wave according to the feedback voltage.

The switch controller includes: a current detector generating the current sense voltage by receiving the sense voltage according to a half-on pulse generated by being synchronized at the half-on time point; a feedback unit generating a feedback that is increased or decreased according to a difference between the current sense voltage and the reference voltage; and a sinewave controller generating the modulation wave by multiplying the feedback voltage to the reference wave.

The current detector includes a buffer including an input terminal connected to the sense voltage, a detection switch connected to an output terminal of the buffer and performing switching according to the half-on pulse, and a capacitor where a sense voltage transmitted through the detection switch is stored.

The feedback unit includes: an error amplifier including a first terminal to which the reference voltage is input and a second terminal to which the current sense voltage is input, and generating an output by amplifying a difference between the input of the first terminal and the input of the second terminal; and a capacitor to which the output of the error amplifier is transmitted.

The switch controller samples a half-on detector sampling a voltage charged during an on-period of the previous switching cycle of the power switch into the half as a half-on reference voltage, and further includes a half-on detector sensing a time point that a voltage charged during an on-period of the present switching cycle reaches the half-on reference voltage as the half-on time point.

The half-on detector includes: a sampling/reset signal generator generating a sampling signal that instructs sampling and a reset signal that instructs reset by being synchronized at a turn-off time point of the power switch; a charging unit generating an on-period voltage that is determined by an on-period of the power switch; a sampling unit sampling the on-period voltage according to the sampling signal and generating a half-on reference voltage by dividing the sampled voltage into the half; and a half-on pulse generator comparing the half-on reference voltage and the on-period voltage and generating a half-on pulse synchronized at the half-on time point according to the comparison result.

The sampling/reset signal generator includes: an inverter outputting an inverse level of a gate voltage that controls switching operation of the power switch; a first delay init outputting the gate voltage by a predetermined first delay period; an AND gate generating a sampling signal by performing AND operation with an output of the inverter and an output of the first delay unit; and a second delay outputting the sampling signal by a predetermined second delay period.

The charging unit includes a capacitor, a current source generating a charging current, a charging current connected between the current source and the capacitor, and being turned on during an on-period of the power switch, and a reset switch coupled to the capacitor in parallel and being switched according to the reset signal.

The sampling unit includes: a sampling switch being switched according to the sampling signal and transmitting the on-period voltage to a first node; a capacitor connected between the first node and a ground; and first and second resistors coupled in series between the first node and the ground, and a voltage of a second node where the first resistor and the second resistor are connected is the half-on reference voltage.

The half-on pulse generator includes: a comparator outputting a result of comparison between the on-period voltage and the half-on reference voltage; an inverter outputting an inverse output of the comparator; a delay unit outputting the output of the inverter after a third delay period; and an AND gate generating the half-on pulse by performing AND operation with the output of the delay unit and the output of the comparator.

The reference wave is synchronized with a frequency of the AC input. The switch controller detects one cycle of the input voltage by sensing a zero voltage crossing time point of the input voltage and generates the reference wave of which a cycle is the same as one cycle of the input voltage. Alternately, the reference wave is DC voltage.

A method for driving a power supply according to another exemplary embodiment of the present invention includes: flowing an input current through a power switch from an AC current during an on-period of the power switch; detecting a half-on time point that is the intermediate time point of the on-period; detecting a sense voltage that is determined by a current flowing to the power switch at the half-on time point; generating a modulation wave by controlling a reference wave according to the detected voltage; and switching the power switch according to a result of the comparison between the modulation wave and the sense voltage.

The detecting the sense voltage at the half-on time point includes generating a current sense voltage by storing the sense voltage in a capacitor at the half-on time point.

The generating the modulation wave includes generating a feedback voltage according to a difference between the current sense voltage and a predetermined reference voltage and controlling the reference wave according to the feedback voltage.

The controlling the reference wave according to the feedback voltage includes multiplying the feedback voltage to the reference wave.

The detecting the half-on time point includes sampling a voltage charged during an on-period of the previous switching cycle of the power switch into the half as a half-on reference voltage and sensing a time point that a voltage charged during an on-period of the present switching cycle reaches the half-on reference voltage as the half-on time point.

The switching the power switch includes turning off the power switch when the sense voltage reaches the modulation wave.

A switch controller according to another exemplary embodiment of the present invention is applied to a power supply that converts an AC input according to switching operation of the power switch.

The switch controller includes: a half-on detector sampling a voltage charged during an on-period of the previous switching cycle of the power switch into the half as a half-on reference voltage, and sensing a time point that a voltage charged during on-period of the present switching cycle reaches the half-on reference voltage as a half-on time point; a current detector generating a current sense voltage by receiving the sense voltage at the half-on time point; a feedback unit generating a feedback voltage according to a difference between the current sense voltage and a predetermined reference voltage; and a sinewave controller controlling a reference wave according to the feedback voltage.

The half-on detector includes: a sampling/rest signal generator generating a sampling signal that instructs sampling and a reset signal that instructs reset by being synchronized at a turn-off time point of the power switch; a charging unit generating an on-period voltage that is determined by an on-period of the power switch; a sampling unit samples the on-period voltage according to the sampling signal and generating a half-on reference voltage by dividing the sampled voltage into the half; and a half-on pulse generator comparing the half-on reference voltage and the on-period voltage and generating a half-on pulse being synchronized at a half-on time point according to a result of the comparison.

According to the exemplary embodiments of the present invention, a switch controller generating an LED current according to CC control by reducing an error of the LED current, a switch control method, and a power supply including the same are provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, an exemplary embodiment of the present invention will be described with reference to the accompanying drawing.

Figure 1:
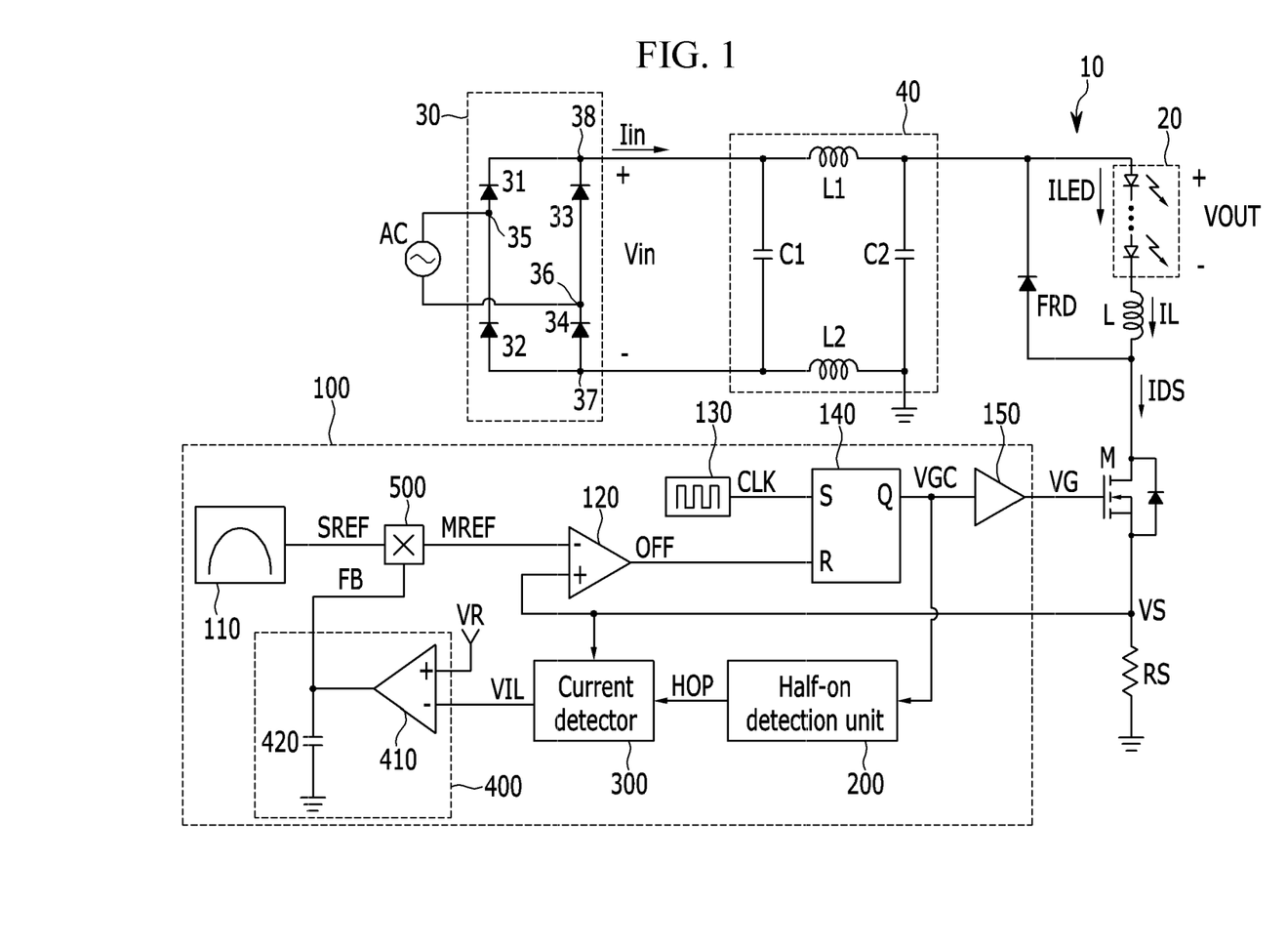
FIG. 1 shows a switch controller and a buck converter including the same according to an exemplary embodiment of the present invention.

FIG. 1 shows a switch controller and a buck converter including the same according to the exemplary embodiment of the present invention. A buck converter 10 is connected to an LED string 20. The LED string 20 includes a plurality of LED elements coupled in series.

The buck converter 10 includes a rectification circuit 30, an EMI filter 40, a diode FRD, an inductor L, a power switch M, a sense resistor RS, and a switch controller 100.

The rectification circuit 30 is realized as a bridge diode, and includes four rectification diodes 31 to 34, two input terminals 35 and 36 connected to an AC input AC, a first terminal 37 connected to a ground, and a second terminal 38 connected to the LED string 20.

The rectification circuit 30 generates an input voltage Vin by full-wave rectifying the AC input AC. The input voltage Vin is a full-wave rectification sinewave. During a turn-on period of the power switch M, the current generated from the AC input AC flows back to the AC current AC through the ground. The current is rectified through the rectification circuit 30 and thus becomes an input current Iin.

The EMI filter 40 protects an element or a circuit in the next stage by eliminating noise generated in a power line connected to the AC input AC through the rectification circuit 30. The EMI filter 40 includes two inductors L1 and L2 and two capacitors C1 and C2.

The inductor L1 includes a first terminal connected to the second terminal 38 of the rectification circuit 30 and a second terminal connected to the LED string 20, and the inductor L2 includes a first terminal connected to the first terminal 37 of the rectification circuit 30 and a second terminal connected to the ground. The capacitor C1 is connected to the first terminal of the inductor L1 and the first terminal of the inductor L2, and the capacitor C2 is connected to the second terminal of the inductor L2 and the second terminal of the inductor L2.

The power switch M performing switching operation according to a gate voltage VG transmitted from the switch controller 100. The power switch M is realized as an n-channel metal oxide semiconductor filed effect transistor (NMOSFET). The present invention is not limited thereto, and other type of transistor element may be used.

A first terminal of the LED string 20 is connected to the input voltage Vin through the EMI filter 40 and a second terminal of the LED string 20 is connected to the first terminal of the inductor L. The diode FRD is connected to a drain electrode of the power switch M and the first terminal of the LED string 20. During a turn-off period of the power switch M, a freewheeling current flowing to the LED string 20 and the inductor L flows through the diode FRD.

The drain electrode of the power switch M is connected to the second terminal of the inductor L and a source electrode is connected to a first terminal of the sense resistor RS. The gate voltage VG transmitted from the switch controller 100 is input to the gate electrode of the power switch M. The power switch M is switched by the gate voltage VG.

When the power switch M is turned on, an inductor current IL increasing according to the input voltage Vin flows through the LED string 20 and the power switch M, and energy is stored in the inductor L by the inductor current IL. In this case, a current (hereinafter, referred to as a drain current IDS) flowing to the power switch M flows to the sense resistor RS and thus the sense voltage VS is generated.

When the power switch M is turned off, the inductor current IL flows while the energy stored in the inductor L exists during the turn-on period. In this case, the inductor current IL is decreased. The decreasing inductor current flows to the LED string 20 through the diode FRD.

During the turn-off period of the power switch M, the input current Iin flows back to the AC input AC through the power switch M and the ground from the AC input AC. In this case, the input current Iin, an LED current ILED, and an drain current IDS are equivalent to each other. During the turn-off period of the power switch M, the input current Iin and the drain current IDS are not generated and the LED current ILED performs freewheeling through the diode FRD.

Since the LED current ILED and the inductor current IL are equivalent to each other, they will not be distinguished in description. The input current Iin and the LED current ILED are also equivalent to each other, excluding a noise component.

The switch controller 100 detects a half-on time point that is an intermediate time point of the turn-on period of the power switch M, and calculates an LED current ILED during one switching cycle of the power switch M using the sense voltage VS at the half-on time point.

An average of LED current ILEDs during one switching cycle of the power switch M is set to the LED current ILED during the one switching cycle of the power switch M. The LED current ILED increases during the turn-on period of the power switch M and decreases during the turn-off period of the power switch M. The average of the LED current ILED during the period is equivalent to the value at the half-on time point.

Figure 2:
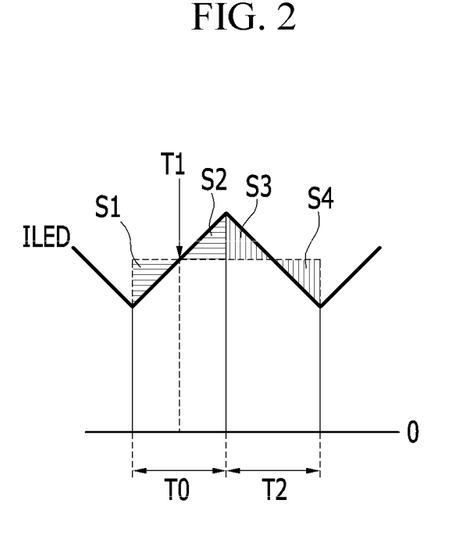
FIG. 2 shows an LED current according to the exemplary embodiment of the present invention.

FIG. 2 shows the LED current according to the exemplary embodiment of the present invention. The waveform of the LED current ILED shown in FIG. 2 is a period that corresponds to one switching cycle of the power switch M.

As shown in FIG. 2, the LED current ILED increase during a turn-on period T0 of the power switch M and decreases during a turn-off period T2. In this case, an average of one switching cycle (T0+T2) of the power switch is the value of the LED current ILED at the half-on time point T1 that corresponds to the intermediate time point of the on-period T0.

As shown in FIG. 2, region S1 and region S2 marked by horizontal lines are equivalent to each other and region S3 and region S4 marked by vertical lines are equivalent to each other, and therefore the value of the LED current ILED at the half-on time point T1 is an average of one switching cycle of the power switch M.

In the exemplary embodiment of the present invention, the LED current ILED is controlled to be controlled by CC control without interference of an input voltage, an output voltage, and inductance of the inductor L by controlling a reference sinewave according to the LED current ILED at the half-on time point.

In further detail, the switch controller 100 calculates an LED current ILED at every switching cycle of the power switch M, generates a modulation sinewave MREF by controlling the reference sinewave SREF according to the calculated LED current ILED, and controls the switching operation of the power switch M according to a comparison result of the modulation sinewave MREF and a sense voltage VS that is determined by the drain current IDS.

For example, the switch controller 100 turns off the power switch M at a time point that the sense voltage VS reaches the modulation sinewave MREF, and turns on the power switch M at a rising edge time point of a clock signal CLK that determines a switching frequency.

The switch controller 100 includes a sinewave generator 110, an off comparator 120, an oscillator 130, an SR flip-flop 140, a gate driver 150, a half-on detector 200, a current detector 300, a feedback unit 400, and a sinewave controller 500.

The sinewave generator 110 senses a zero voltage crossing time of the input voltage Vin and detects one cycle of the input voltage Vin, and generates a reference sinewave SREF that corresponds to a full-wave rectification sinewave of a cycle that equals to one cycle of the input voltage Vin. The reference sinewave SREF is just an example, synchronized with a frequency of the AC input, but the reference wave of the exemplary embodiment of the present invention is not limited to a sinewave. For example, the reference wave may be one of a square wave of a sinewave SREF 1, a triangle wave SREF 2, a square wave SREF 3, and so on. Alternatively, the reference wave may be a DC voltage.

The sinewave controller 500 generates the modulation sinewave MREF by controlling the reference sinewave SREF according to a feedback voltage FB. The sinewave controller 500 can generate the modulation sinewave MREF by multiplying the feedback voltage FB to the reference sinewave SREF. The modulation sinewave MREF is generated by just the reference sinewave SREF, but the modulation wave of the exemplary embodiment of the present invention is not limited to a sine wave. The modulation sinewave MREF can be changed when the reference wave changes.

The off comparator 120 generates a high-level off signal OFF to turn off the power switch M at a time point that the sense voltage VS reaches the modulation sinewave MREF by comparing the modulation sinewave MREF and the sense voltage VS.

The modulation sinewave MREF is input to an inversion terminal (−) of the off comparator 120 and the sense voltage VS is input to a non-inversion terminal (+) of the off comparator 120, and when an input of the non-inversion terminal (+) of the off comparator 120 is higher than an input of the inversion terminal (−), the off comparator 120 generates a high-level off signal OFF and generates a low-level off signal OFF in the opposite case.

The oscillator 130 generates the clock signal CLK that determines the switching cycle of the power switch M.

The SR flip-flop 140 generates a gate control signal VGC that turns on the power switch M according to the clock signal CLK, and generates a gate control signal VGC that turns off the power switch M according to the off signal OFF. The SR flip-flop 140 includes a set terminal S to which the clock signal CLK is input and a reset terminal R to which the off signal OFF is input.

The SR flip-flop 140 generates a high-level gate control signal VGC when the input of the set terminal S is high level, and generates a low-level gate control signal VGC when the input of the reset terminal R is high level.

The gate driver 150 generates the gate voltage VG according to the gate control signal VGC. For example, the gate driver 150 generates a high-level (i.e., enable level) gate voltage VG according to the high-level gate control signal VGC, and generates a low-level (i.e., disable level) gate voltage VG according to the low-level gate control signal VGC.

The half-on detector 200 detects a half-on time point according to a result of comparison between a voltage (hereinafter, referred to as a half-on reference voltage HRV) sampled by dividing a voltage charged during the on-period of the previous switching cycle into the half and a voltage charged during the on-period of the present switching cycle.

That is, a time point that the voltage charged from the turn-on time point of the power switch M reaches the half-on reference voltage HRV set in the previous switching cycle is detected as the half-on time point of the present switching cycle.

Hereinafter, the half-on detector 200 will be described with reference to FIG. 3.

Figure 3:
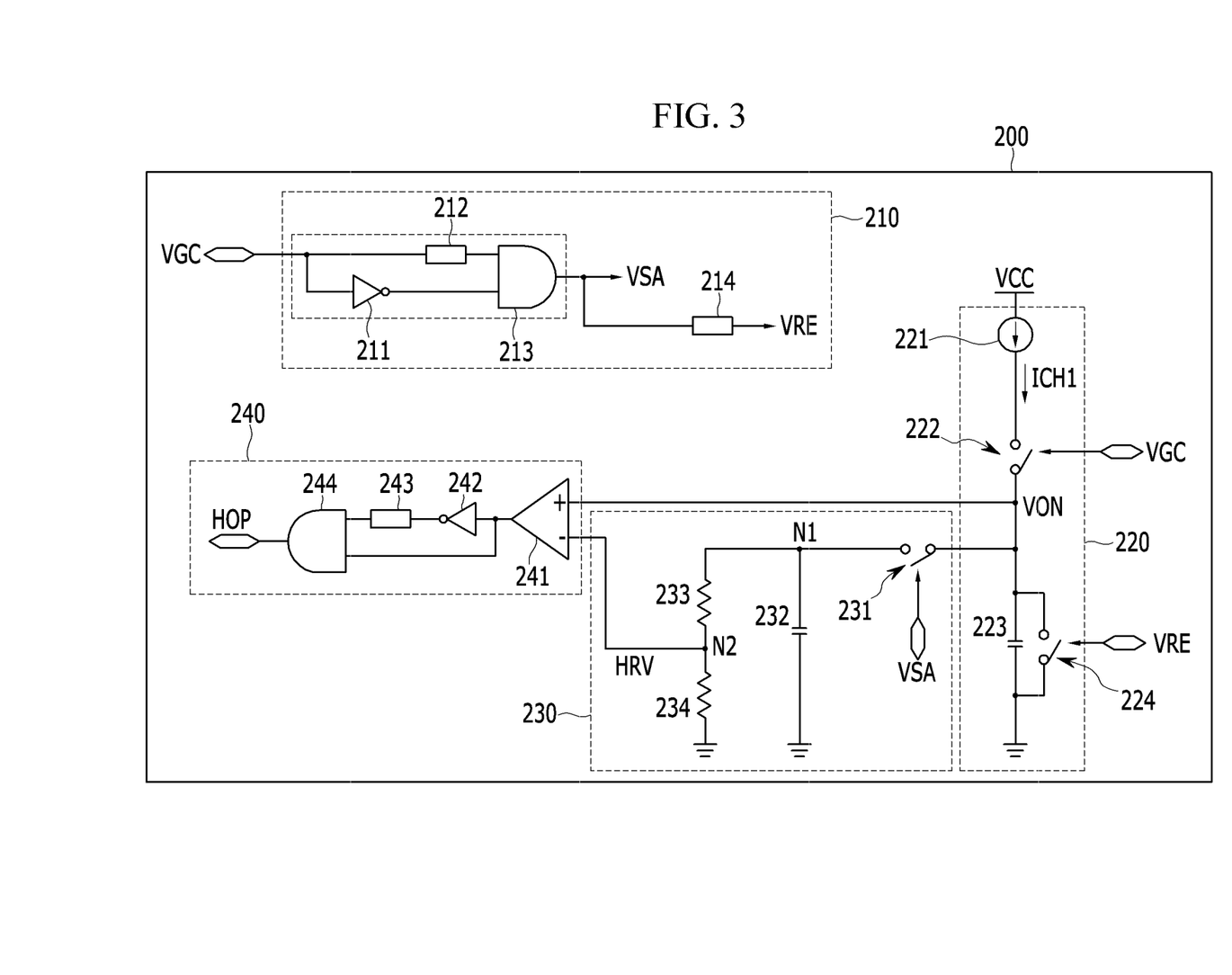
FIG. 3 shows a half-on detector according to the exemplary embodiment of the present invention.

FIG. 3 shows the half-on detector according to the exemplary embodiment of the present invention.

As shown in FIG. 3, the half-on detector 200 includes a sampling/reset signal generator 210, a charging unit 220, a sampling unit 230, and a half-on pulse generator 240. The half-on detector 200 illustrated in FIG. 1 receives the gate control signal VGC. However, the exemplary embodiment of the present invention is not limited thereto, and the half-on detector 200 may receive the gate voltage VG instead of the gate control signal VGC.

The sampling/reset signal generator 210 generates a sampling signal VSA that instructs sampling and a reset signal VRE that instructs reset by being synchronized at the turn-off time point of the power switch M. The sampling/reset signal generator 210 may sense the turn-off time point by using the gate control signal VGC.

The sampling/reset signal generator 210 includes an inverter 211, a delay unit 212, an AND gate 213, and a delay unit 214.

The inverter 211 outputs an inverse level of the gate control signal VGC. The inverter 211 outputs an inverse low-level of the high-level gate control signal VGC and outputs an inverse high-level of the low-level gate control signal VGC.

The delay unit 212 receives the gate control signal VGC, and outputs the gate control signal VGC after delaying the gate control signal VGC by a predetermined first delay period DL1.

The AND gate 213 receives an output of the inverter 211 and an output of the delay unit 212, and generates the sampling signal VSA by performing an AND operation with the inputs.

The delay unit 214 receives the sampling signal VSA, and outputs a reset signal VRE by delaying the sampling signal VSA by a predetermined second delay period DL2. In the exemplary embodiment of the present invention, the first delay period DL1 and the second delay period DL2 are set to be equivalent to each other.

The charging unit 220 generates an on-period voltage VON that depends on the on-period. The charging unit 220 generates the on-period voltage VON by charging the capacitor 223 with a charging current ICH1 during the on-period according to the gate control signal VGC, and resets the on-period voltage VON according to the reset signal VRE.

The charging unit 220 includes a current source 221, a charging switch 222, the capacitor 223, and a reset switch 224.

The current source 221 is connected to a voltage VCC, and generates the charging current ICH1 using the voltage VCC.

The charging switch 222 includes a first terminal connected to the current source 221 and a second terminal connected to the capacitor 223, and being switched according to the gate control signal VGC. The charging switch 222 is turned on by the enable level (high level in the exemplary embodiment of the present invention) of the gate control signal VGC.

During the turn-on period of the charging switch 222, the capacitor 223 is charged by the charging current ICH1 and thus the on-period voltage VON is increased. The second terminal of the capacitor 223 is connected to the ground.

The reset switch 224 includes a first terminal connected to the first terminal of the capacitor 223 and a second terminal connected to the ground, and being switched according to the reset signal VRE. The reset switch 224 is turned on by the high-level reset signal VRE and discharges the capacitor 223. Then, the on-period voltage VON is reset to zero voltage.

The sampling unit 230 samples the on-period voltage VON according to the sampling signal VSA, and generates a half-on reference voltage HRV by dividing the sampled voltage into the half.

The sampling unit 230 includes a sampling switch 231, a capacitor 232, and two resistors 233 and 234.

The sampling switch 231 includes a first terminal connected to the on-period voltage VON and a second terminal connected to a node N1, and being switched according to the sampling signal VSA. The sampling switch 231 is turned on by the high-level sampling signal VSA.

The capacitor 232 includes a first terminal connected to the node N1 and a second terminal connected to the ground. The resistor 233 is connected between the node N1 and a node N2, and the resistor 234 is connected between the node N2 and the ground.

During the on-period of the sampling switch 231, a voltage of the node N1 is equivalent to the on-period voltage VON, the sampling switch 231 is turned off, and the on-period voltage VON is maintained by the capacitor 232.

The voltage of the node N1 is distributed by the resistors 233 and 234, and the distributed voltage becomes a voltage of the node N2, that is, the half-on reference voltage HRV. Since the resistor 233 and the resistor 234 have the same resistance, the half-on reference voltage HRV is the voltage of the node N1, that is, the half of the sampled on-period voltage VON.

Ad described, the sampling unit 230 samples the half of the on-period voltage VON increased during the on-period of the power switch M as the half-on reference voltage HRV.

The half-on pulse generator 240 compares the half-on reference voltage HRV and the on-period voltage VON, and generates a half-on pulse HOP synchronized at the half-on time point according to the comparison result.

The half-on pulse generator 240 includes a comparator 241, an inverter 242, a delay unit 243, and an AND gate 244.

The comparator 241 includes a non-inversion terminal (+) to which the on-period voltage VON is input and an inversion terminal (−) to which the half-on reference voltage HRV is input, and outputs high-level when the input of the non-inversion terminal (+) is higher than the input of the inversion terminal (−) and outputs low level in the opposite case.

The inverter 242 receives the output of the comparator 241, and outputs an inverse level of the output of the comparator 241.

The delay unit 243 receives the output of the inverter 242, and outputs the output of the inverter 242 after delaying the output by a third delay period DL3.

The AND gate 244 receives the output of the delay unit 243 and the output of the comparator 241, and generates the half-on pulse HOP by performing AND operation with the two inputs.

Hereinafter, operation of the half-on detector 200 according to the exemplary embodiment of the present invention will be described with reference to FIG. 4.

Figure 4:
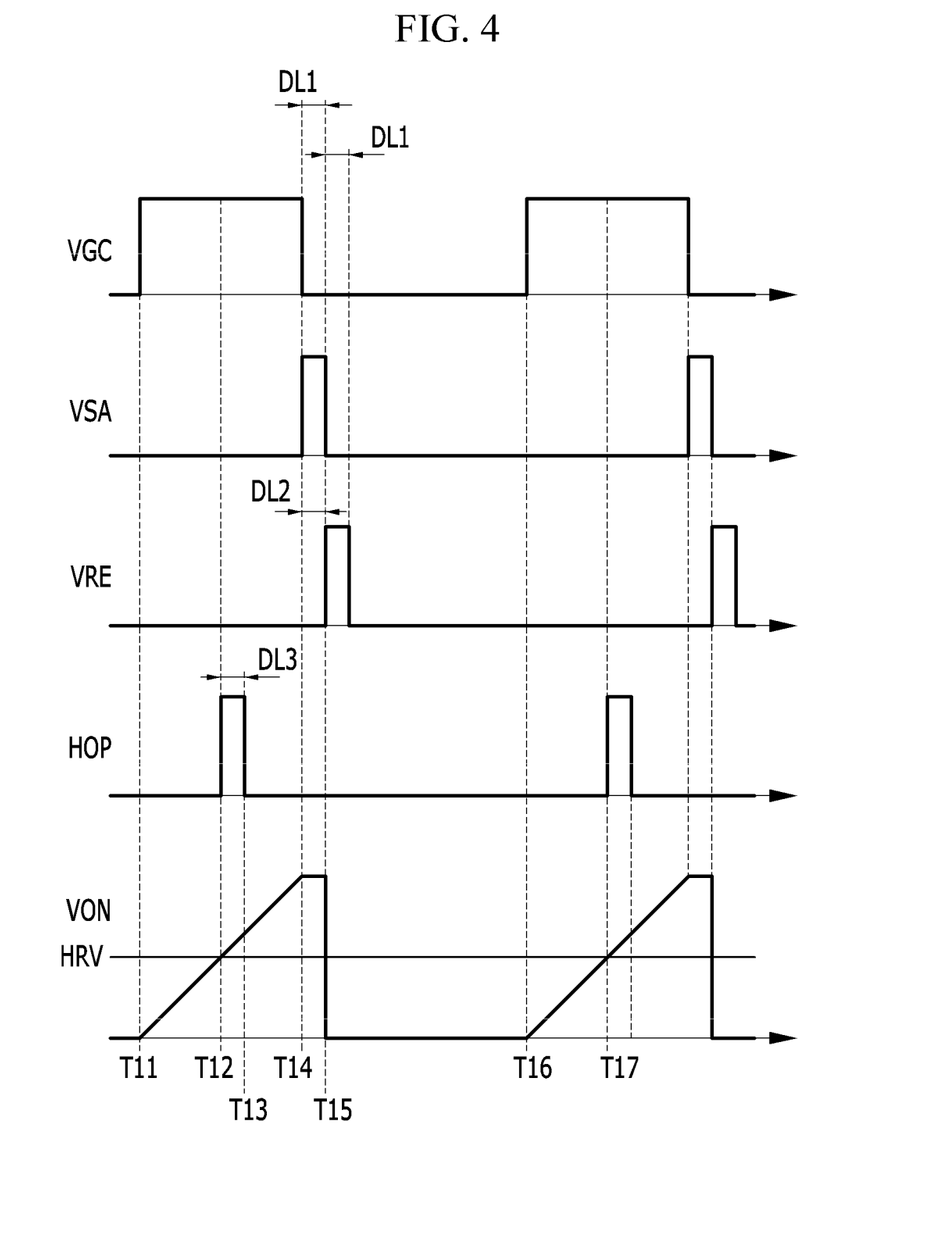
FIG. 4 is a waveform diagram of a gate control signal, a sampling signal, a reset signal, an on-period voltage, and a half-on pulse according to the exemplary embodiment of the present invention.

FIG. 4 is a waveform diagram of the gate control signal, the sampling signal, the reset signal, the on-period voltage, and the half-on pulse according to the exemplary embodiment of the present invention.

As shown in FIG. 4, at a time point T11, the gate control signal VGC is increased to high level and the charging switch 222 is charged and thus the on-period voltage VON beings to increase.

At a time point T12, the increasing on-period voltage VON reaches the half-on reference voltage HRV and the output of the comparator 241 becomes high level. The half-on reference voltage HRV at the time point T12 corresponds to the half of the voltage charged in the capacitor 223 during the on-period of the previous switching cycle of the time point T11.

At the time point T12, the output of the inverter 242 is high level and the output of the comparator 241 is increased to high level, and therefore a high-level half-on pulse HOP is generated from the AND gate 244 during the third delay period DL3 from the time point T12.

Since the low-level output of the inverter 242 is input to the AND gate 244 at a time point T13 that is a time point after the third delay period DL3 from the time point T12, the half-on pulse HOP becomes low level.

At a time point T14, the gate control signal VGC is decreased to low level and the output of the inverter 211 is increased to high level. Since the output of the delay unit 212 is high level at the time point T14, the AND gate 213 generates a high-level sampling signal VSA at the time point T14.

At the time point T14, the charging switch 222 is turned off and the on-period voltage VON charged in the capacitor 223 during the turn-on period of the power switch M is constantly maintained from the time point T14.

Since the output of the delay unit 212 becomes low level at a time point T15 that is a time point after the first delay period DL1 from the time point T14, the sampling signal VSA becomes low level at the time point T15. Thus, the sampling signal VSA becomes a high-level pulse during a period T14 to T15.

During the period T14 to T15, the sampling switch 231 is turned on and the on-period voltage VON is transmitted to the node N1. At the time point T15, the sampling switch 231 is turned off by the low-level sampling signal VSA and the on-period voltage VON is maintained by the capacitor 232. At the time point T14, the on-period voltage VON transmitted to the node N1 has a level that is determined according to the on-period T11 to T14, and the half-on reference voltage HRV is set to the half of the on-period voltage VON.

The delay unit 214 delays the sampling signal VSA by the second delay period DL2 from the time point T14 and thus outputs the reset signal VRE at the time point T15. At the time point T15, the reset switch 224 is turned on by the reset signal VRE and thus the on-period voltage VON becomes zero voltage.

At a time point T16, the gate control signal VGC becomes high level, and the half-on detector 200 repeats operation during the period T11 to T14 from the T16.

The first to third delay periods DL1 to DL3 may be set to a short period of time, like 300 ns. In FIG. 4, the first to third delay periods DL1 to DL3 are illustrated to be wide for convenience of description, but the first to third delay periods DL1 to DL3 are substantially a short period of time.

Hereinafter, the current detector 300 and the feedback unit 400 according to the exemplary embodiment of the present invention will be described with reference to FIG. 5 and FIG. 6.

Figure 5:
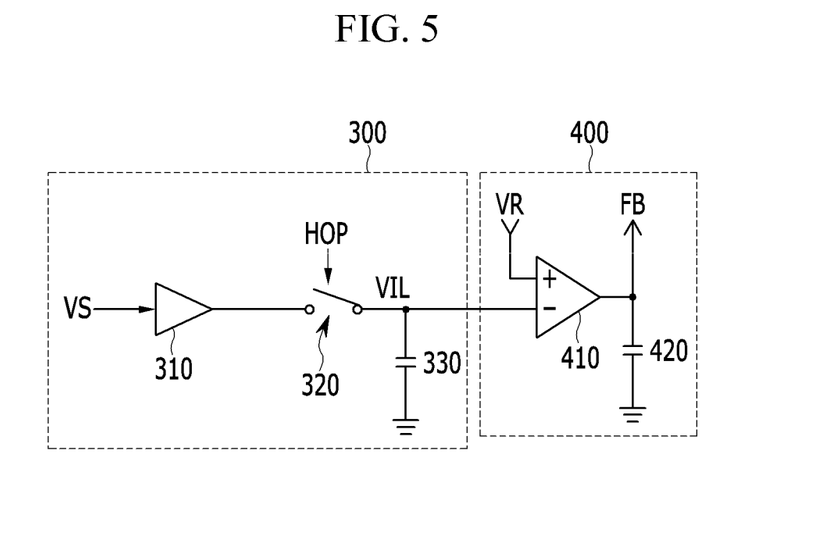
FIG. 5 shows a configuration of a current detector according to the exemplary embodiment of the present invention.

FIG. 5 shows a configuration of the current detector according to the exemplary embodiment of the present invention. For convenience of description, the current detector 300 and the feedback unit 400 are illustrated in FIG. 5.

Figure 6:
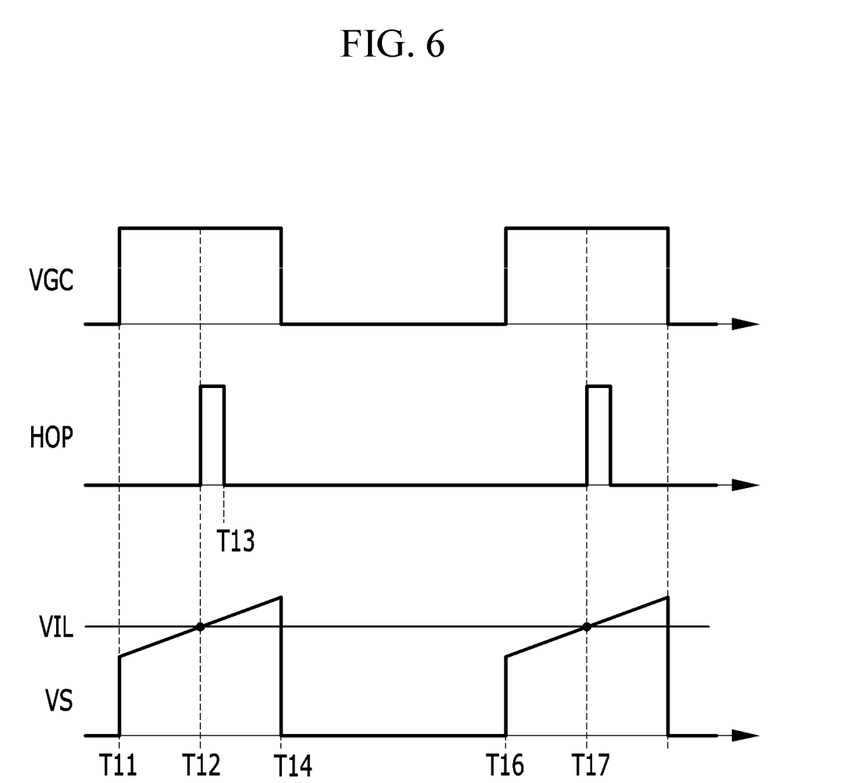
FIG. 6 shows a gate control signal, a half-on pulse, and a sense voltage according to the exemplary embodiment of the present invention.

FIG. 6 shows the gate control signal, the half-on pulse, and the sense voltage according to the exemplary embodiment of the present invention.

The current detector 300 generates a current sense voltage VIL by sampling the sense voltage VS according to the half-on pulse HOP.

The current detector 300 includes a buffer 310, a detection switch 320, and a capacitor 330.

The buffer 310 receives the sense voltage VS and transmits the receive sense voltage to the next stage. An input terminal of the buffer 310 is connected to the sense voltage VS and an output terminal of the buffer 310 is connected to a first terminal of the detection switch 320.

The detection switch 320 performs switching operation according to the half-on pulse HOP. The detection switch 320 is turned on by a high-level half-on pulse HOP. A second terminal of the detection switch 320 is connected to a first terminal of the capacitor 330.

A second terminal of the capacitor 330 is connected to the ground, and the sense voltage VS transmitted through the detection switch 320 is stored in the capacitor 330. That is, a sense voltage VS at a turn-on time point of the detection switch 320 according to the half-on pulse HOP is stored in the capacitor 330.

Therefore, a sense voltage VS corresponding to an LED current ILED at an intermediate time point of the on-period of the power switch M is stored in the capacitor 330, and a voltage stored in the capacitor 330 corresponds to the current sense voltage VIL.

As shown in FIG. 6, at a time point T12, the detection switch 320 is turned on and the sense voltage VS is stored in the capacitor 330. Since the time point T12 is the intermediate time point of the on-period T11 to T14, the current sense voltage VIL at the time point T12 is a voltage that corresponds to an average of the LED currents ILED during one switching period T11 to T16 of the power switch M.

At a time point T17, the half-on pulse HOP is generated and the detection switch 320 is turned on. Then, the current sense voltage VIL at the time point T17 becomes a voltage that corresponds to an average of the LED current ILED during the next switching cycle of the power switch M.

The current sense voltage VIL is transmitted to the feedback unit 400.

The feedback unit 400 generates a feedback voltage FB according to a difference between the current sense voltage VIL and the reference voltage VR. For example, the feedback voltage FB is generated to decrease the difference between the current sense voltage VIL and the reference voltage VR.

In further detail, the feedback unit 400 includes an error amplifier 410 and a capacitor 420. The error amplifier 410 determines an output by amplifying a difference between a non-inversion terminal (+) and an inversion terminal (−) with a predetermined gain. The current sense voltage VIL is input to the inversion terminal (−) of the error amplifier 410 and the reference voltage VR is input to the non-inversion terminal (+) thereof.

The error amplifier 410 subtracts the current sense voltage VIL from the reference voltage VR, amplifies a result of the subtraction, and transmits the result of the amplification to the capacitor 420. Capacitance of the capacitor 420 is set to be sufficient enough, and the difference between the reference voltage VR and the current sense voltage VIL is added to the previous feedback voltage FB.

Then, the feedback voltage FB is decreased when the current sense voltage VIL that is updated at every switching cycle (e.g., half-on time point) is higher than the reference voltage VR, and the feedback voltage FB is increased when the current sense voltage VIL is lower than the reference voltage VR.

That is, the feedback voltage FB is decreased when the LED current ILED is increased, and the feedback voltage FB is increased when the LED current ILED is decreased. Since the modulation sinewave MREF is proportional to the feedback voltage FB, the modulation sinewave MREF is decreased when the LED current ILED is increased and the modulation sinewave MREF is increased when the LED current ILED is decreased.

The off comparator 120 generates an off signal OFF that turns off the power switch M when the modulation sinewave MREF reaches the sense voltage VS, and therefore, the duty of the power switch M is decreased when the LED current ILED is increased and the duty of the power switch M is increased when the LED current ILED is decreased. As described, the LED current ILED according to the exemplary embodiment of the present invention is controlled by a constant current.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS buck converter 10, LED string 20, diode FRD, rectification circuit 30
EMI filter 40, inductor L, power switch M, sense resistor RS
switch controller 100, rectification diode 31-34, sinewave generator 110
Off comparator 120, oscillator 130, SR flip-flop 140
gate driver 150, half-on detector 200, current detector 300
sampling/reset signal generator 210, charging unit 220, sampling unit 230
half-on pulse generator 240, inverter 211 and 242
delay unit 212, 214, and 243, AND gate 213 and 244, current source 221
charging switch 222, reset switch 224, capacitor (223, 232, 330, 420)
sampling switch 231, resistor 233 and 234, comparator 241
buffer 310, detection switch 320, error amplifier 410

What is claimed is:

1. A power supply comprising:
a rectification circuit configured to be coupled to an AC input and generate an input voltage and an input current;
a power switch configured to receive the input current from the rectification circuit during an on-period; and
a switch controller configured to:
detect a half-on time point that is a half time point of the on-period;
detect a sense voltage based on a current flowing to the power switch during the on-period at the half-on time point;
generate a modulation wave based on a reference wave and the detected sense voltage; and
control switching operation of the power switch based on the modulation wave.

2. The power supply of claim 1, wherein the switch controller is configured to:
generate a current sense voltage based on the sense voltage at the half-on time point;
generate a feedback voltage based on a difference between the current sense voltage and a predetermined reference voltage; and
control the reference wave based on the feedback voltage.

3. The power supply of claim 2, wherein the switch controller comprises:
a current detector configured to generate the current sense voltage based on the sense voltage and a half-on pulse, the half-on pulse being synchronized at the half-on time point;
a feedback unit configured to generate a feedback signal that varies based on a difference between the current sense voltage and the reference voltage; and a sinewave controller configured to generate the modulation wave based on the feedback voltage and the reference wave.

4. The power supply of claim 3, wherein the current detector comprises:
a buffer including an input terminal configured to receive the sense voltage;
a detection switch having an input connected to an output terminal of the buffer and performing switching based on the half-on pulse; and
a capacitor coupled to an output of the detection switch, the capacitor configured to store the sense voltage transmitted through the detection switch.

5. The power supply of claim 3, wherein the feedback unit comprises:
an error amplifier configured to generate an output by amplifying a difference between the reference voltage and the current sense voltage; and
a capacitor configured to be charged by the output of the error amplifier.

6. The power supply of claim 1, wherein the switch controller includes a half-on detector configured to sample a voltage charged during an on-period of the previous switching cycle of the power switch into the half as a half-on reference voltage, and further configured to sense a time point that a voltage charged during an on-period of a present switching cycle reaches the half-on reference voltage as the half-on time point.

7. The power supply of claim 6, wherein the half-on detector comprises:
a sampling/reset signal generator configured to generate a sampling signal and a reset signal that are synchronized based on a turn-off time point of the power switch;
a charging unit configured to generate an on-period voltage that is determined by an on-period of the power switch;
a sampling unit configured to sample the on-period voltage based on the sampling signal and to generate a half-on reference voltage; and
a half-on pulse generator configured to generate a half-on pulse synchronized at the half-on time point based on a comparison of the half-on reference voltage and the on-period voltage.

8. The power supply of claim 7, wherein the sampling/reset signal generator comprises:
an inverter outputting an inverse level of a gate voltage that controls switching operation of the power switch;
a first delay unit configured to generate a first delay signal based on the gate voltage delayed by a predetermined first delay period;
an AND gate generating a sampling signal by performing AND operation with an output of the inverter and the first delay signal of the first delay unit; and
a second delay unit configured to generate a second delay signal based on the sampling signal delayed by a predetermined second delay period.

9. The power supply of claim 7, wherein the charging unit comprises:
a capacitor,
a current source configured to generate a charging current, and
a reset switch switched according to the reset signal, wherein said reset switch is configured to charge the capacitor during the on-period of the power switch.

10. The power supply of claim 7, wherein the sampling unit comprises:
a sampling switch configured to provide the on-period voltage to a first node based on the sampling signal a capacitor connected between the first node and a ground; and
a first and a second resistor coupled in series between the first node and a ground,
wherein a voltage at a second node between the first resistor and the second resistor is the half-on reference voltage.

11. The power supply of claim 7, wherein the half-on pulse generator comprises:
a comparator configured to generate a comparator signal based on a comparison between the on-period voltage and the half-on reference voltage;
an inverter configured to generate an inverse signal based on an inverse of the comparator signal;
a delay unit configured to generate a delayed signal based on the inverse signal delayed by a third delay period; and
an AND gate generating the half-on pulse by performing AND operation with the delayed signal and the comparator signal.

12. The power supply of claim 1, wherein the reference wave is synchronized with a frequency of the AC input.

13. The power supply of claim 12, wherein the switch controller detects one cycle of the input voltage by sensing a zero voltage crossing time point of the input voltage, and generates the reference wave, wherein a cycle of said reference wave corresponds to one cycle of the input voltage.

14. The power supply of claim 1, wherein the reference wave is a DC voltage.

15. A method for driving a power supply, comprising:
providing an input current through a power switch from an AC current during an on-period of the power switch;
detecting a half-on time point that is a half time point of the on-period;
detecting a sense voltage based on a current flowing to the power switch at the half-on time point;
generating a modulation wave by controlling a reference wave based on the detected sense voltage; and
switching the power switch based on a result of the comparison between the modulation wave and the sense voltage,
wherein the reference wave is synchronized with a frequency of the AC input.

16. The method for driving the power supply of claim 15, wherein detecting the sense voltage at the half-on time point comprises generating a current sense voltage by storing the sense voltage in a capacitor at the half-on time point.

17. The method for driving the power supply of claim 15, wherein generating the modulation wave comprises generating a feedback voltage based on a difference between the current sense voltage and a predetermined reference voltage and controlling the reference wave based on the feedback voltage.

18. The method for driving the power supply of claim 15, wherein controlling the reference wave according to the feedback voltage comprises multiplying the feedback voltage to the reference wave.

19. The method for driving the power supply of claim 15, wherein detecting the half-on time point comprises:
sampling a voltage charged during an on-period of the previous switching cycle of the power switch into the half as a half-on reference voltage, and
sensing a time point that a voltage charged during an on-period of the present switching cycle reaches the half-on reference voltage as the half-on time point.

20. The method for driving the power switch of claim 15, wherein switching the power switch comprises turning off the power switch when the sense voltage reaches the modulation wave.

21. A switch controller of a power supply that converts an AC input according to switching operation of the power switch, comprising:
- a half-on detector configured to:
  - sample a voltage charged during an on-period of the previous switching cycle of the power switch into the half as a half-on reference voltage, and
  - sense a time point that a voltage charged during on-period of the present switching cycle reaches the half-on reference voltage as a half-on time point;
- a current detector configured to generate a current sense voltage based on the sense voltage at the half-on time point;
- a feedback unit configured to generate a feedback voltage based on a difference between the current sense voltage and a predetermined reference voltage; and
- a sinewave controller configured to control a reference wave based on the feedback voltage.

22. The switch controller of claim 21, wherein the half-on detector comprises:
- a sampling/rest signal generator configured to generate a sampling signal and a reset signal that are synchronized based on a turn-off time point of the power switch;
- a charging unit configured to generate an on-period voltage that is determined by an on-period of the power switch;
- a sampling unit configured to sample the on-period voltage based on the sampling signal and to generate a half-on reference voltage; and
- a half-on pulse generator configured to generate a half-on pulse synchronized at the half-on time point based on a comparison of the half-on reference voltage and the on-period voltage.

* * * * *

UNITED STATES PATENT AND TRADEMARK OFFICE
CERTIFICATE OF CORRECTION

PATENT NO. : 9,362,843 B2  Page 1 of 1
APPLICATION NO. : 13/965485
DATED : June 7, 2016
INVENTOR(S) : Hyun-Chul Eum et al.

It is certified that error appears in the above-identified patent and that said Letters Patent is hereby corrected as shown below:

In the claims,
In column 15, line 1, in Claim 20, delete "switch" and insert -- supply --, therefor.

Signed and Sealed this
Twenty-third Day of August, 2016

Michelle K. Lee
*Director of the United States Patent and Trademark Office*